US009941741B2

(12) United States Patent
Jantunen et al.

(10) Patent No.: US 9,941,741 B2
(45) Date of Patent: Apr. 10, 2018

(54) METHOD, APPARATUS, AND COMPUTER PROGRAM PRODUCT FOR POWERING ELECTRONICS IN SMART COVERS

(71) Applicant: Nokia Corporation, Espoo (FI)

(72) Inventors: Joni Jantunen, Helsinki (FI); Jani Ollikainen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 680 days.

(21) Appl. No.: 13/847,615

(22) Filed: Mar. 20, 2013

(65) Prior Publication Data

US 2014/0285033 A1    Sep. 25, 2014

(51) Int. Cl.
| | |
|---|---|
| H02J 17/00 | (2006.01) |
| H02J 50/80 | (2016.01) |
| H04B 5/00 | (2006.01) |
| H04M 1/725 | (2006.01) |
| H04M 1/02 | (2006.01) |

(52) U.S. Cl.
CPC .............. *H02J 17/00* (2013.01); *H02J 50/80* (2016.02); *H04B 5/0031* (2013.01); *H04B 5/0037* (2013.01); *H04B 5/0062* (2013.01); *H04M 1/72575* (2013.01); *H04M 1/0283* (2013.01)

(58) Field of Classification Search
CPC ............... H04B 5/0062; H04B 5/0037; H04M 1/72575
See application file for complete search history.

(56) References Cited

U.S. PATENT DOCUMENTS

| | | | | |
|---|---|---|---|---|
| 4,742,573 A | * | 5/1988 | Popovic .................. | G01S 17/74 235/454 |
| 5,196,682 A | * | 3/1993 | Englehardt .......... | G06K 7/1097 235/454 |
| 5,528,409 A | * | 6/1996 | Cucci ................... | H04B 10/807 398/113 |
| 6,840,455 B2 | * | 1/2005 | Norton ................. | G06K 7/1097 235/439 |
| 7,032,822 B2 | | 4/2006 | Waters | |

(Continued)

FOREIGN PATENT DOCUMENTS

WO    WO 2011157900 A1 *    12/2011    .......... H04M 1/0258

OTHER PUBLICATIONS

Crothers, "Inside the iPad: Apple's new 'A4'chip," Jan. 27, 2010, Cnet, pp. 1-3.*

(Continued)

*Primary Examiner* — Thienvu Tran
*Assistant Examiner* — Pinping Sun
(74) *Attorney, Agent, or Firm* — Locke Lord LLP

(57) ABSTRACT

Example method, apparatus, and computer program product embodiments are disclosed for wireless powering of passive objects contained in a functional exchangeable cover of an apparatus. Example embodiments of the invention include a method comprising: receiving, by an apparatus, a signal indicating that a functional exchangeable cover attached to the apparatus requests optical powering, the signal being at least one of a mechanical signal, an electrical signal, or a wireless signal; switching on, by the apparatus, an optical energy source in the apparatus in response to received signal; and transmitting, by the apparatus, from the optical energy source, optical power to the functional exchangeable cover attached to the apparatus.

16 Claims, 9 Drawing Sheets

(56) References Cited

U.S. PATENT DOCUMENTS

| | | | | |
|---|---|---|---|---|
| 7,305,260 B2* | 12/2007 | Vuori | ............... | H04M 1/72575 455/456.1 |
| 7,421,269 B2* | 9/2008 | Kostiainen | ........ | H04M 1/72575 379/433.04 |
| 7,514,899 B2* | 4/2009 | Deng-Peng | ............. | H02J 7/025 136/291 |
| 7,962,186 B2* | 6/2011 | Cui | ............... | H01Q 1/243 455/41.2 |
| 8,301,024 B2* | 10/2012 | Mather | ............... | H04M 19/048 396/176 |
| 8,494,582 B1* | 7/2013 | Ellis | ............... | H04M 1/0254 455/41.2 |
| 8,846,255 B2* | 9/2014 | Dineen | ............... | B64D 41/00 429/400 |
| 2007/0114967 A1* | 5/2007 | Peng | ............... | H02J 7/025 320/101 |
| 2008/0272889 A1 | 11/2008 | Symons | | |
| 2010/0041333 A1 | 2/2010 | Ungari et al. | | |
| 2010/0078995 A1 | 4/2010 | Hyde et al. | | |
| 2010/0079005 A1 | 4/2010 | Hyde et al. | | |
| 2010/0190436 A1* | 7/2010 | Cook | ............... | H04B 5/00 455/41.1 |
| 2010/0281183 A1 | 11/2010 | Van Bebber | | |
| 2010/0328043 A1* | 12/2010 | Jantunen | ............... | G06K 7/0008 340/10.3 |
| 2011/0279882 A1* | 11/2011 | Chan | ............... | H04B 10/807 359/238 |
| 2012/0075796 A1* | 3/2012 | Attlesey | ............... | H05K 7/20772 361/679.53 |
| 2012/0235636 A1* | 9/2012 | Partovi | ............... | H02J 7/025 320/108 |
| 2012/0329405 A1 | 12/2012 | Lee et al. | | |
| 2013/0093388 A1* | 4/2013 | Partovi | ............... | H01F 5/003 320/108 |
| 2013/0181539 A1 | 7/2013 | Muratov et al. | | |
| 2013/0215042 A1 | 8/2013 | Messerschmidt et al. | | |
| 2014/0016945 A1* | 1/2014 | Pan | ............... | H04B 10/1143 398/171 |
| 2014/0070774 A1* | 3/2014 | Terlizzi | ............... | H02J 7/0004 320/162 |
| 2014/0086586 A1* | 3/2014 | Voutilainen | ............ | H04M 1/003 398/115 |
| 2014/0195826 A1* | 7/2014 | Wojcik | ............... | H05K 5/0086 713/300 |
| 2014/0222855 A1* | 8/2014 | Lucero | ............... | G06F 17/30283 707/769 |

OTHER PUBLICATIONS

"ST Extends Family of RFID/NFC Wireless Memory ICs", SmartSense, 2011.11.20 21:58:53, http://thesmartsense.com/print/38666, copied from website on Mar. 29, 2013.

"JEDEC Announces Plans to Standardize Non-Volatile Wireless Memory", Arlington, Va., USA—April 12, 2012, http://www.jedec.org/news/pressreleases/jedec-announces-plans-standardize-non-volatile-wireless-memory, copied from website on Mar. 29, 2013.

Iiro Jantunen, Joni Jantunen, Jaakko Varteva, and Jarmo Arponen, "Wireless Memory Tags", Nokia Research Center, Helsinki, Finland, http://elec.aalto.fi/fi/current/news/ict2008_minami_wirelessmemorytags_nokia.pdf; copied from website on Mar. 29, 2013.

Iiro Jantunen, Joni Jantunen, Harald Kaajaa, Sergey Boldyrev, Le Wang, Jyri Hämäläinen, " System Architecture for High-speed Close-proximity Low-power RF Memory Tags and Wireless Internet Access", International Journal on Advances in Telecommunications, vol. 4 No. 3 & 4, year 2011, pp. 217-228.

* cited by examiner

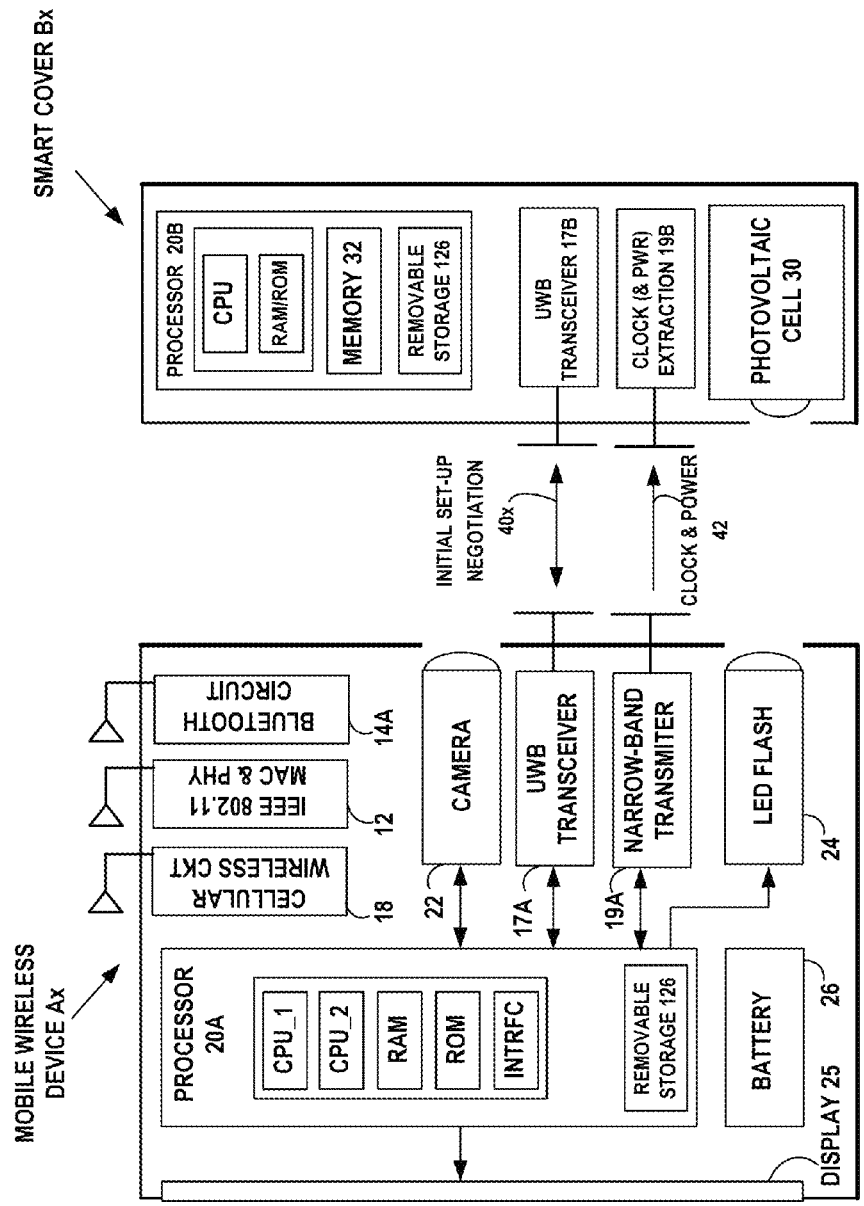

STEP 332: RECEIVING, BY AN APPARATUS, A SIGNAL INDICATING THAT A FUNCTIONAL EXCHANGEABLE COVER ATTACHED TO THE APPARATUS REQUESTS OPTICAL POWERING, THE SIGNAL BEING AT LEAST ONE OF A MECHANICAL SIGNAL, AN ELECTRICAL SIGNAL, OR A WIRELESS SIGNAL;

STEP 334: SWITCHING ON, BY THE APPARATUS, AN OPTICAL ENERGY SOURCE IN THE APPARATUS IN RESPONSE TO RECEIVED SIGNAL; AND

STEP 336: TRANSMITTING, BY THE APPARATUS, FROM THE OPTICAL ENERGY SOURCE, OPTICAL POWER TO THE FUNCTIONAL EXCHANGEABLE COVER ATTACHED TO THE APPARATUS.

STEP 362: SENDING, BY A FUNCTIONAL EXCHANGEABLE COVER ATTACHED TO AN ELECTRONIC DEVICE, A SIGNAL TO THE ELECTRONIC DEVICE, INDICATING THAT THE FUNCTIONAL EXCHANGEABLE COVER IS TO BE POWERED BY OPTICAL POWERING, THE SIGNAL BEING AT LEAST ONE OF A MECHANICAL SIGNAL, AN ELECTRICAL SIGNAL, OR A WIRELESS SIGNAL;

STEP 364: COLLECTING, BY THE FUNCTIONAL EXCHANGEABLE COVER, ENERGY FROM THE RECEIVED OPTICAL POWERING SIGNAL FROM THE ELECTRONIC DEVICE IN RESPONSE TO THE SIGNAL; AND

STEP 366: OPERATING COMPONENTS OF THE FUNCTIONAL EXCHANGEABLE COVER USING AT LEAST THE OPTICAL POWER FROM THE MOBILE WIRELESS DEVICE.

METHOD, APPARATUS, AND COMPUTER PROGRAM PRODUCT FOR POWERING ELECTRONICS IN SMART COVERS

FIELD

The field of the invention relates to wireless communication, and more particularly to wireless powering of electronics in smart covers.

BACKGROUND

Modern society has adopted, and is becoming reliant upon, wireless communication devices for various purposes, such as connecting users of the wireless communication devices with other users. Wireless communication devices may vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other short-range communication technologies include Bluetooth™ Low Energy, IEEE 802.11 wireless local area network (WLAN), Wireless USB, ZigBee (IEEE 802.15.4, IEEE 802.15.4a), and ultra high frequency radio frequency identification (UHF RFID) technologies. All of these wireless communication technologies have features and advantages that make them appropriate for various applications.

Near field communication technologies, such as radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product. In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch may establish an NFC connection that may be used to exchange specific information for another communications protocol, which may then be used to create an actual connection in the other communications protocol, such as Bluetooth™ or wireless local area network (WLAN).

SUMMARY

Example method, apparatus, and computer program product embodiments are disclosed for wireless powering of passive objects contained in a cover of an apparatus.

Example embodiments of the invention include a method comprising:

receiving, by an apparatus, a signal indicating that a functional exchangeable cover attached to the apparatus requests optical powering, the signal being at least one of a mechanical signal, an electrical signal, or a wireless signal;

switching on, by the apparatus, an optical energy source in the apparatus in response to received signal; and transmitting, by the apparatus, from the optical energy source, optical power to the functional exchangeable cover attached to the apparatus.

Example embodiments of the invention include a method comprising:

receiving, by the apparatus, a radio frequency wireless message from the functional exchangeable cover of the apparatus, indicating optical power requirements of the cover; and transmitting, by the apparatus, optical power at a level based on the indicated optical power requirements.

Example embodiments of the invention include a method comprising:

receiving, by the apparatus, a radio frequency wireless message from the functional exchangeable cover of the apparatus, indicating a change in optical power requirements of the cover of the apparatus; and adjusting, by the apparatus, the optical power transmitted by the apparatus based on the indicated change in optical power requirements.

Example embodiments of the invention include a method comprising:

wherein the radio frequency signal comprises a near field communications signal, an RFID signal, or an ultra-wide bandwidth signal.

Example embodiments of the invention include a method comprising:

transmitting a radio frequency signal providing initial power to the functional exchangeable cover of the apparatus, the signal comprising near field communication signal; and transmitting, by the apparatus, optical power to the cover, to supplement the energy provided by the radio frequency signal.

Example embodiments of the invention include a method comprising:

receiving, by the apparatus, a radio frequency wireless message from the functional exchangeable cover of the apparatus, indicating no more optical power is required by the cover of the apparatus; and switching off, by the apparatus, the optical energy source in the apparatus.

Example embodiments of the invention include a method comprising:

wherein the apparatus comprises a mobile wireless device that includes a camera and the optical energy source in the apparatus is an optical flash associated with the camera.

Example embodiments of the invention include a method comprising:

sending, by a functional exchangeable cover attached to an electronic device, a signal to the electronic device, indicating that the functional exchangeable cover is to be powered by optical powering, the signal being at least one of a mechanical signal, an electrical signal, or a wireless signal;

collecting, by the functional exchangeable cover, energy from the received optical powering signal from the electronic device in response to the signal; and operating components of the functional exchangeable cover using at least the optical power from the mobile wireless device.

Example embodiments of the invention include a method comprising:

transmitting, by the apparatus, a radio frequency wireless message to the mobile wireless device, indicating optical power requirements of the apparatus; and receiving, by the apparatus, optical power from the mobile wireless device, at a level based on the indicated optical power requirements.

Example embodiments of the invention include a method comprising:

transmitting, by the apparatus, a radio frequency wireless message to the mobile wireless device, indicating a change in optical power requirements of the apparatus; and receiving, by the apparatus, an adjusted level of the optical power from the mobile wireless device, based on the indicated change in optical power requirements.

Example embodiments of the invention include an apparatus comprising:

an optical energy source;

at least one processor;

at least one memory including computer program code;

the at least one memory and the computer program code configured to, with the at least one processor, cause the apparatus at least to:

receive a signal indicating that a functional exchangeable cover attached to the apparatus requests optical powering, the signal being at least one of a mechanical signal, an electrical signal, or a wireless signal;

switch on an optical energy source in the apparatus in response to received signal; and transmit from the optical energy source, optical power to the functional exchangeable cover attached to the apparatus.

Example embodiments of the invention include an apparatus comprising:

the at least one memory and the computer program code configured to, with the at least one processor, cause the apparatus at least to:

receive a radio frequency wireless message from the functional exchangeable cover of the apparatus, indicating optical power requirements of the cover; and transmit optical power at a level based on the indicated optical power requirements.

Example embodiments of the invention include an apparatus comprising:

the at least one memory and the computer program code configured to, with the at least one processor, cause the apparatus at least to:

receive a radio frequency wireless message from the functional exchangeable cover of the apparatus, indicating a change in optical power requirements of the cover of the apparatus; and adjust the optical power transmitted by the apparatus based on the indicated change in optical power requirements.

Example embodiments of the invention include an apparatus comprising:

wherein the radio frequency signal comprises a near field communications signal, an RFID signal, or an ultra-wide bandwidth signal.

Example embodiments of the invention include an apparatus comprising:

the at least one memory and the computer program code configured to, with the at least one processor, cause the apparatus at least to:

transmit a near field communications signal that provides energy to the functional exchangeable cover of the apparatus; and transmit optical power to the cover of the apparatus, to supplement the energy provided by the near field communications signal.

Example embodiments of the invention include an apparatus comprising:

the at least one memory and the computer program code configured to, with the at least one processor, cause the apparatus at least to:

receive a radio frequency wireless message from the functional exchangeable cover of the apparatus, indicating no more optical power is required by the cover of the apparatus; and switch off the optical energy source in the apparatus.

Example embodiments of the invention include an apparatus comprising:

wherein the apparatus comprises a mobile wireless device that includes a camera and the optical energy source in the apparatus is an optical flash associated with the camera.

Example embodiments of the invention include an apparatus comprising:

an optical power receiver;

a connection element configured to attach to and release from a hosting electronic device;

at least one processor;

at least one memory including computer program code;

the at least one memory and the computer program code configured to, with the at least one processor, cause the functional exchangeable cover at least to:

send to the hosting electronic device, a signal indicating that the functional exchangeable cover is to be powered by optical powering, the signal being at least one of a mechanical signal, an electrical signal, or a wireless signal;

collect energy from the received optical powering signal from the hosting electronic device in response to the signal; and operate components of the functional exchangeable cover using at least the optical power from the hosting electronic device.

Example embodiments of the invention include an apparatus comprising:

the at least one memory and the computer program code configured to, with the at least one processor, cause the functional exchangeable cover at least to:

transmit a radio frequency wireless message to the hosting electronic device, indicating optical power requirements of the functional exchangeable cover; and receive optical power from the hosting electronic device, at a level based on the indicated optical power requirements.

Example embodiments of the invention include an apparatus comprising:

the at least one memory and the computer program code configured to, with the at least one processor, cause the functional exchangeable cover at least to:

transmit a radio frequency wireless message to the hosting electronic device, indicating a change in optical power requirements of the functional exchangeable cover; and receive an adjusted level of the optical power from the hosting electronic device, based on the indicated change in optical power requirements.

Example embodiments of the invention include a computer program product comprising computer executable program code recorded on a computer readable non-transitory storage medium, the computer executable program code comprising:

code for receiving, by an apparatus, a signal indicating that a functional exchangeable cover attached to the apparatus requests optical powering, the signal being at least one of a mechanical signal, an electrical signal, or a wireless signal;

code for switching on, by the apparatus, an optical energy source in the apparatus in response to received signal; and code for transmitting, by the apparatus, from the optical energy source, optical power to the functional exchangeable cover attached to the apparatus.

Example embodiments of the invention include a computer program product comprising computer executable program code recorded on a computer readable non-transitory storage medium, the computer executable program code comprising:

code for sending, by a functional exchangeable cover attached to an electronic device, a signal to the electronic device, indicating that the functional exchangeable cover is to be powered by optical powering, the signal being at least one of a mechanical signal, an electrical signal, or a wireless signal;

code for collecting, by the functional exchangeable cover, energy from the received optical powering signal from the electronic device in response to the signal; and code for operating components of the functional exchangeable cover using at least the optical power from the mobile wireless device.

The resulting embodiments enable wireless powering of passive objects contained in a cover of an apparatus.

DESCRIPTION OF THE FIGURES

FIG. 1C is an example network diagram of a mobile wireless device Ax and a smart cover Bx, performing an initial setup negotiation using a combined UWB and narrow-band wireless memory tag technology. The negotiation is to establish supplementary optical power delivery from the mobile wireless device Ax to the smart cover Bx, in accordance with example embodiments of the invention.

FIG. 3A is an example flow diagram of the process performed by mobile wireless device A, in accordance with example embodiments of the invention.

FIG. 3B is an example flow diagram of the process performed by the smart cover B, in accordance with example embodiments of the invention.

DISCUSSION OF EXAMPLE EMBODIMENTS OF THE INVENTION

Figure 1:
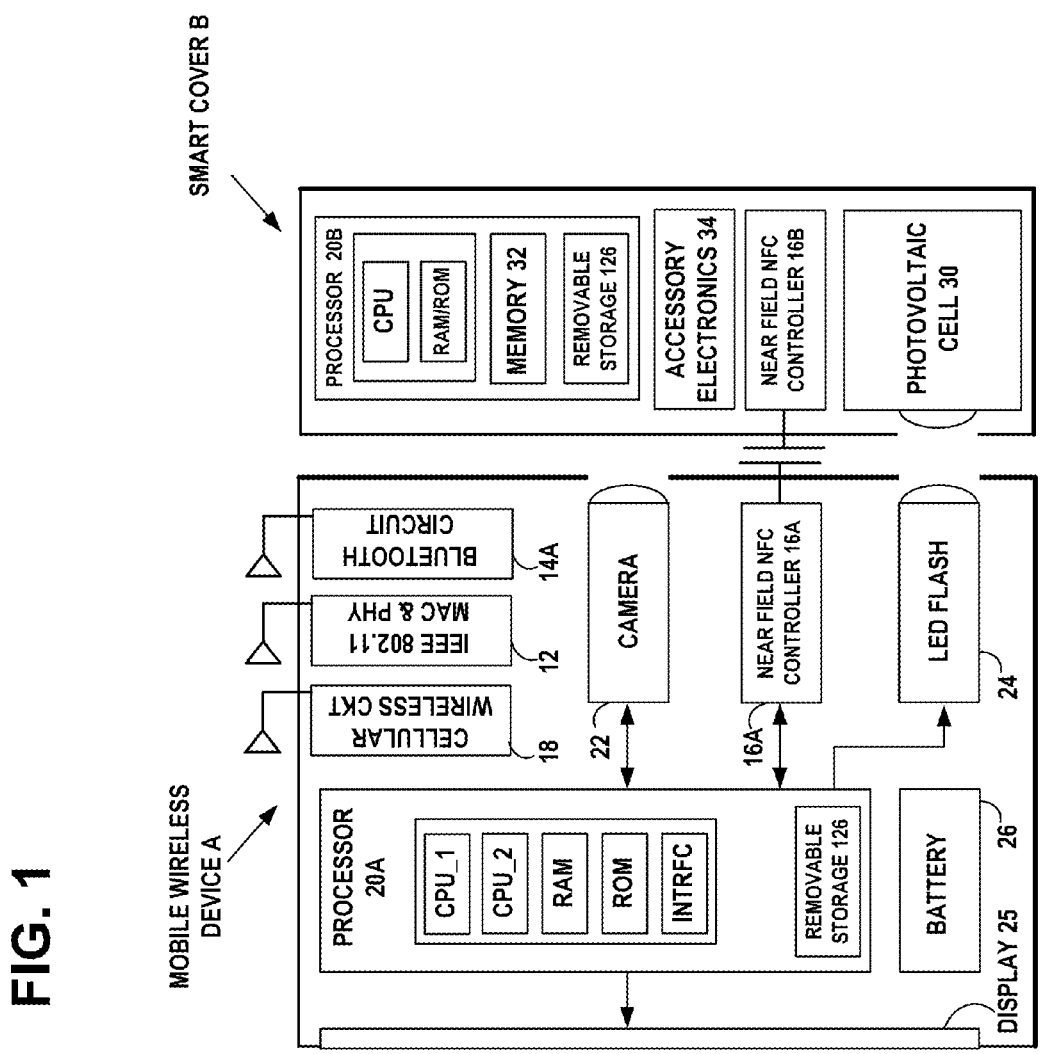
FIG. 1 is an example functional block diagram of a mobile wireless device A and a smart cover B, where the cover is in its normal, close contact position with the backside of the mobile wireless device. The cover protects the camera lens and camera flash also located on the back side of the device, in accordance with example embodiments of the invention.

This section is organized into the following topics:
A. Wireless Short-Range Communication Networks
B. Bluetooth™ Communication Technology
C. Near-Field Communication (NFC) Technology
D. Wireless Memory Tag Technology
E. Smart Cover Technology
F. Digital Camera Technology
G. Use of Mobile Device Camera Flash for Powering Electronics In Smart Covers A. Wireless Short-Range Communication Networks Short-range communication technologies provide communication solutions appropriate for many data applications, without the cost, traffic and legislative concerns of longer-range communication technologies. Short-range communication technologies include Bluetooth basic rate/enhanced data rate (BR/EDR), Bluetooth Low Energy (LE), IEEE 802.11 wireless local area network (WLAN), Wireless Universal Serial Bus (WUSB), ZigBee (IEEE 802.15.4, IEEE 802.15.4a), and near field communication technologies, such as radio frequency identification (RFID) and near field communication (NFC) technology that enable contactless identification and interconnection of wireless devices.

B. Bluetooth™ Communication Technology

A procedure for forming connections between Bluetooth™ devices is described in the *Bluetooth™ Specification*, Version 4, Jun. 30, 2010. The Bluetooth™ Baseband is the part of the Bluetooth™ system that implements the Media Access Control (MAC) and physical layer procedures to support the connection formation, exchange of data information streams, and ad hoc networking between Bluetooth™ devices. Connection formation may include inquiry, inquiry scanning, inquiry response, in addition to paging, page scanning, and page response procedures.

C. Near-Field Communication (NFC) Technology

Near field communication technologies, such as radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product.

RFID transponders may be the passive type or the active type. A passive RFID transponder requires no internal power source to communicate with an RFID reader, and is only active when it is near an RFID reader that energizes the transponder with a continuous radio frequency signal at a resonant frequency of the antenna. The small electrical current induced in the antenna by the continuous radio frequency signal provides enough power for an integrated circuit in the transponder to power up and transmit a modulated response, typically by backscattering the continuous carrier wave from the RFID reader. A passive RFID transponder may include writable electrically erasable, programmable, read-only memory (EEPROM) for storing data received from the RFID reader, which modulates the continuous carrier wave sent by the RFID reader. Reading distances for passive RFID transponders typically range from a few centimeters to a few meters, depending on the radio frequency and antenna design. By contrast, active RFID transponders require a power source to receive and transmit information with an RFID reader. The RFID transponder may be affixed to or integrated with a mobile wireless device and the user may bring the RFID transponder on one device close to an RFID reader circuit in another mobile wireless device to allow near field communication between the devices. In example embodiments, both devices may have RFID reader circuits to read RFID signals from the other device.

In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch may establish an NFC connection, which is then compatible with other known wireless technologies, such as Bluetooth™ or wireless local area network (WLAN).

Near-field communication (NFC) technology communicates between two NFC Devices or between an NFC device And an NFC Tag via magnetic field induction, where two loop antennas are located within each other's near field, effectively energizing a wireless contact by forming an air-core transformer. An example NFC radio operates within the unlicensed radio frequency ISM band of 13.56 MHz, with a bandwidth of approximately 2 MHz over a typical distance of a few centimeters. The NFC radio may be affixed to a new wireless client device (STA) and the user brings the NFC radio on the device close to an access point (AP) or Registrar of the Network to allow near field communication between the devices.

NFC technology is an extension of the ISO/IEC 14443 proximity-card standard (incorporated herein by reference) for contactless smartcards and radio frequency ID (RFID) devices, which combines the interface of a contactless smartcard and a reader into a single device, and uses the ISO/IEC 18092 NFC communication standard (incorporated herein by reference) to enable two-way communication. An NFC radio may communicate with both existing ISO/IEC 14443 contactless smartcards and readers, as well as with other NFC devices by using ISO/IEC 18092. The ISO/IEC 18092 standard defines communication modes for Near Field Communication Interface and Protocol (NFCIP-1) using inductively coupled devices operating at the center frequency of 13.56 MHz for interconnection of computer peripherals. The ISO/IEC 18092 standard specifies modulation schemes, codings, transfer speeds and frame format of the RF interface, initialization schemes, conditions required for data collision control during initialization, and a transport protocol including protocol activation and data exchange methods.

NFC devices may also be used for low power level wireless powering. A special wireless powering mode may be used to keep high power transfer efficiency on during the whole data transfer session of the wireless memory operation. Power transfer of 20-50 mW power class may be done using standard NFC transceivers and typical NFC antennas up to 30 mm distances.

The NFC Data Exchange Format (NDEF) specification, NFC Forum Data Exchange Format (NDEF) Specification, NFC Forum™, 2006 (incorporated herein by reference), defines a common data format for NFC devices to exchange application or service specific data. An NDEF message is constructed of a number of NDEF records, with the first and the last record providing message begin and end markers. Between two NFC Devices, NDEF messages may be exchanged over the NFC Logical Link Control Protocol (LLCP) protocol, specified in NFC Forum Logical Link Control Protocol Specification, NFC Forum™, 2009 (incorporated herein by reference). The NFC Connection Handover specification, NFC Forum Connection Handover Specification, NFC Forum™, Jul. 7, 2010 (incorporated herein by reference), defines the exchange of NDEF messages between two NFC Devices in a negotiated handover to discover and negotiate alternative wireless communication technologies.

D. Wireless Memory Tag Technology

NFC devices may also be used for low power level wireless powering. As an example, a mobile wireless device may provide power wirelessly to a wireless memory tag. With wireless powering, a large memory and an ultra-low power wireless broadband transceiver embedded in the tag may be powered for wireless reading and writing of the memory in the tag. A special wireless powering mode may be used to keep high power transfer efficiency on during the whole data transfer session of the wireless memory operation. Power transfer of 20-50 mW power class may be done using standard NFC transceivers and typical NFC antennas up to 30 mm distances.

A wireless memory tag may be an integrated package that comprises a digital memory and an NFC controller capable of exchanging NFC radio frequency (RF) signals with other NFC controllers or with NFC tags. A wireless memory tag typically has no battery power of its own, but extracts its operating power from an NFC signal received from another NFC controller. The memory of a wireless memory tag may be a non-volatile memory such as an electrically erasable, programmable, read-only memory (EEPROM) module that may be combined with a volatile random access memory (RAM) module. The memory is coupled to the NFC controller that includes operating logic and transport layer firmware. An NFC discovery RF signal sequence may be exchanged between two NFC controllers, each sequence of RF signals comprising a plurality of discovery periods. Discovery periods may include a poll interval, a listen interval, and an idle interval. For example, an NFC Reader/Writer device such as a tag reader that is part of a mobile telephone, has sufficient power to transmit poll messages in polling intervals. A general purpose NFC device such as a mobile telephone, may have some or all of those intervals, depending on the device's mode of operation. An NFC controller in a wireless memory tag that has no battery power available, must rely on receiving poll messages from other devices and then extracting its operating power from the received poll message to respond with its own poll message.

Wireless memory tags may include radio-frequency identification tags that are accessed with very high data rates. These wireless memory tags may be powered by a continuous wave radio signal at one set powering radio frequency (for example 13.56 MHz or 900 MHz) while data transfer is carried out using simple on-off keying on a set of ultra-wideband communication radio frequencies. The wireless memory tags may be designed to operate over short distances in order to enable very high data rates.

A wireless device may include both a narrow-band transmitter to provide both power and clock signals to a wireless memory tag. The wireless device may further include an ultra-wide band transceiver to transmit and receive ultra-wide band signals with the wireless memory tag, at a very high data rate within reference time frames established by the narrow-band clock signals. Correspondingly, the wireless memory tag may include a wireless module to extract the narrow-band clock signal and wireless power signal to establish the reference time frames and to receive the operating power from the wireless device. The wireless memory module may further include an ultra-wide band transceiver to transmit and receive the ultra-wide band signals with the wireless device, at the very high data rate within the reference time frames established by the narrow-band clock signals.

The narrow-band signal may have an example frequency in the range of 860 MHz to 960 MHz or 13.56 MHz. The bandwidth of the narrow band signal depends on embodiment and may be for example, 50 KHz to 1 MHz. The narrow-band synchronization signal provides a timing reference for wireless memory tags that are within range. The ultra-wide band transceiver may have an example frequency of 7.9 GHz. Another frequency band is the 60 GHz ISM band. The wireless memory tag may reside anywhere within a range corresponding to a radio propagation distance on the order of half a meter.

E. Smart Cover Technology

Mobile wireless devices, such as cell phones, are compactly made to conveniently fit in the user's pocket or purse. The compact overall design of the device imposes limited space for the layout of the necessary electronics, such as sensors, extra memory, special purpose processor chips and various input-output devices. Typically, a protective case or hard cover may be affixed to either the backside or display side or both sides of the device. Recent designs for mobile wireless devices have taken advantage of space that may be available within the case or protective cover, for the placement of electronic components. Such cases or covers have been referred to as "smart covers". In order to power and communicate with the electronic components in the smart cover, it has been necessary to hardwire the power and communication connections with the main body of the device.

Generally, a smart cover may be characterized as an exchangeable or detachable, functional cover that may include electronic components that require power to operate. A smart cover may be fixed or exchangeable, and the smart cover may be an add-on cover or an exchangeable one.

F. Digital Camera Technology

Many wireless mobile devices, such as cell phones, include a digital camera. Digital cameras include a single lens or a lens system for forming an image on a sensor, such as a solid-state sensor. Under the control of a processor, an image is captured when the user takes a picture and the captured image may be stored in a memory. The camera may have a user-interface to allow the user to choose the settings of the camera. The camera may also have a flash unit with an emissive light source, such as a light emitting diode (LED), powered by the camera's battery, to illuminate the object being photographed. The flash unit may be operatively connected to the processor so that the light source of the flash unit may be controlled or addressed by the processor. The camera may have an ambient light sensing unit for determining the level of ambient light. A lookup table associated with the processor, may store calibration weights for the amount of power to be applied to the flash unit LED to compensate for various levels of ambient light sensed by the light sensing unit. If the sensor signal is below a pre-defined value, the flash unit is identified as the main source of illumination, and the calibration weights is selected from the lookup table to produce a correct amount of illumination to enable capturing a good image of the object being photographed.

G. Use of Mobile Device Camera Flash for Powering Electronics in Smart Covers

In accordance with an example embodiment of the invention, a mobile wireless device that includes a digital camera and a flash unit, may have a smart cover that covers either the backside or the display side or both sides of the device to protect the device. The space available within the smart cover may contain accessory electronic components, such as sensors, extra memory, special purpose processor chips, and various input-output devices that may be used by the mobile wireless device to perform various functions. The smart cover may include a photovoltaic cell, solar panel, or other optical energy receiving device that is mounted within the smart cover so as to be approximately aligned with and face the flash unit, when the smart cover is in its covering position on the device.

The smart cover may be characterized as an exchangeable or detachable, functional cover that may include electronic components that require power to operate. A smart cover may be fixed or exchangeable, and the smart cover may be an add-on cover or an exchangeable one. In accordance with an example embodiment of the invention, the smart cover may be an add-on cover to a wireless device that has a fixed cover. In accordance with an example embodiment of the invention, the smart cover may be the default cover on a wireless device that has an exchangeable cover by default.

In accordance with an example embodiment of the invention, the camera flash of the mobile wireless device may be used to provide operating power to accessory electronic components in the smart cover. The camera flash in the mobile wireless device may be located so that most of the light available from the camera flash will illuminate the photovoltaic cell of the smart cover. The light transmitted by the camera flash may be collected in the cover by the photovoltaic cell or solar panel and used to operate the accessory electronic components in the cover. In this manner, power is made available in the cover for data transfer and processing by the accessory electronic components in the smart cover.

In accordance with an example embodiment of the invention, the light transmitted by the camera flash may be digitally modulated to enable the transfer of control and/or data information from the mobile wireless device, via the photovoltaic cell, to the accessory electronic components in the smart cover.

In accordance with an example embodiment of the invention, the camera flash of the mobile wireless device may be used to provide supplemental power to the accessory electronic components in the smart cover. An NFC controller in the mobile wireless device may be used to transmit signal energy that is collected by an NFC controller in the smart cover and used to power the smart cover's electronics. The additional optical power provided by the camera flash may supplement the signal energy that is collected by the NFC controller in the smart cover.

In an example embodiment of the invention, the smart cover may send a mechanical signal, an electrical signal, or a wireless signal to the mobile wireless device, indicating that accessory electronic components in the smart cover are to be powered by optical powering. The signal may indicate a capability to use optical powering or a current need for optical powering of the components in the smart cover. In an alternate example embodiment of the invention, the signal may result from a user input to a user interface of the mobile wireless device commanding the mobile wireless device to provide optical power to the smart cover.

In accordance with an example embodiment of the invention, the NFC controller of the mobile wireless device may send an NFC interrogation signal to read the NFC controller of the smart cover and receive a radio frequency NFC response signal from the cover. The response signal may indicate that the smart cover is capable of receiving optical powering. An initial setup negotiation may be conducted between the mobile wireless device and the smart cover, via an NFC connection established between the devices. The mobile wireless device may receive a radio frequency wireless message from the smart cover, indicating optical power requirements of the smart cover. In response, the mobile wireless device may transmit optical power at a level based on the indicated optical power requirements.

Then, in accordance with an example embodiment of the invention, the mobile wireless device may switch on its camera flash and transmit the optical power to the smart cover in response to the indicated optical power requirements.

In accordance with an example embodiment of the invention, the smart cover may receive the optical power from the mobile wireless device and use it to operate the accessory electronic components in the smart cover, including sensors, extra memory, special purpose processor chips, and various input-output devices.

In accordance with an example embodiment of the invention, the mobile wireless device may receive an NFC message from the smart cover, indicating a change in optical power requirements of the cover. In response, the mobile wireless device may adjust the optical power that it transmits, based on the indicated change in optical power requirements.

In accordance with an example embodiment of the invention, the mobile wireless device may transmit optical power to the smart cover, which provides energy to the wireless device to supplement other energy provided to the smart cover by the near field communications signal.

In accordance with an example embodiment of the invention, the mobile wireless device may receive an NFC message from the smart cover, indicating no more optical power is required by the cover and, in response, switch off the camera flash energy source in the mobile wireless device.

In accordance with an example embodiment of the invention, both the mobile wireless device and the smart cover may include an RFID reader module and an RFID transponder module that may be either the passive type or the active type. A passive RFID transponder requires no internal power source to communicate with an RFID reader, and is only active when it is near an RFID reader that energizes the transponder with a continuous radio frequency signal at a resonant frequency of the antenna. The continuous radio frequency signal provides enough power for an integrated circuit in the transponder to power up and transmit a modulated response. The response may typically be by backscattering the continuous carrier wave back to the RFID reader. In accordance with an example embodiment of the invention, the RFID reader module of the mobile wireless device may send an RFID interrogation signal to read the RFID transponder of the smart cover and receive a backscattered RFID response signal from the RFID transponder of the smart cover. The response signal may indicate that the smart cover is capable of receiving optical powering. An initial setup negotiation may be conducted between the mobile wireless device and the smart cover, via the RFID reader modules and RFID transponder modules of the devices. The mobile wireless device may receive a radio frequency wireless message from the smart cover, indicating optical power requirements of the smart cover. In response, the mobile wireless device may transmit optical power at a level based on the indicated optical power requirements.

In accordance with an example embodiment of the invention, an alternative to a camera flash may be the light source of a pico projector. It may be used in at least two example ways: 1) the projectors lens may be directly pointed towards the smart cover, or 2) there may be an alternative light guide that is used to channel the projector's light to a convenient location for powering the smart cover.

In accordance with an example embodiment of the invention, an alternative to a camera flash may be any suitably located and bright enough light source for powering. In case a mobile device, tablet, etc. may contain a separate torch, that may also be used.

FIG. 1 is an example functional block diagram of a mobile wireless device A and a smart cover B, where the cover B is in its normal, close contact position with the backside of the mobile wireless device A. The cover protects the camera lens 22 and camera flash 24, which are also located on the back side of the mobile wireless device A, in accordance with example embodiments of the invention.

In accordance with an example embodiment of the invention, the mobile wireless device A may be a communications device, PDA, cell phone, laptop or palmtop computer, or the like. The mobile wireless device A includes a processor 20A that includes a dual core or multi-core central processing unit (CPU_1 and CPU_2), a random access memory (RAM), a read only memory (ROM), for storing data and/or computer program code, and interface circuits to interface with one or more radio transceivers, battery and other power sources, key pad, touch screen, display, microphone, speakers, ear pieces, camera or other imaging devices, etc. in the mobile wireless device A. The RAM and ROM may be removable memory devices such as smart cards, SIMs, WIMs, semiconductor memories such as RAM, ROM, PROMS, flash memory devices, etc. The NCI driver in mobile wireless device A communicates over an NFC controller interface (NCI) with NCI firmware in the NFC controller 16A via a transport layer driver in mobile wireless device A and a transport layer firmware in NFC controller 16A.

The mobile wireless device A may include a digital camera 22 and an LED flash or other suitable flash source 24. The digital camera may include a single lens or a lens system for forming an image on a sensor, such as a solid-state sensor. Under the control of the processor 20A, an image is captured when the user takes a picture and the captured image may be stored in the RAM memory. The camera 22 may have a user-interface to allow the user to choose the settings of the camera. The camera 22 may also have a flash unit 24 with an emissive light source, such as a light emitting diode (LED) or other suitable flash source, powered by the battery 26, to illuminate the object being photographed. The flash unit 24 may be operatively connected to the processor 20A so that the LED light source or other suitable flash source of the flash unit 24 may be controlled or addressed by the processor 20A. The camera 22 may have an ambient light sensing unit for determining the level of ambient light. A lookup table associated with the processor 20A, may store calibration weights for the amount of power to be applied to the flash unit LED or other suitable flash source 24 to compensate for various levels of ambient light sensed by the light sensing unit. If the sensor signal is below a pre-defined value, the flash unit 24 is identified as the main source of illumination, and the calibration weight is selected from the lookup table to produce a correct amount of illumination to enable capturing a good image of the object being photographed.

The mobile wireless device A and smart cover B are each coupled to an NFC controller 16A and NFC controller 16B, respectively, via an NFC controller interface (NCI). The NFC controllers 16A and 16B are capable of exchanging near-field communication (NFC) RF signals, according to an embodiment of the present invention. The mobile wireless device A may request that the NFC controller 16A start discovery by sending a "discover" command. Once discovery has been started, the NFC controller 16A may notify the mobile wireless device A of every detectable target NFC device or cover by sending a Notification with a Status and relevant parameters.

The NFC controller 16A may be embodied as hardware, software, firmware, or a combination of these constructs. It may be an integral part of the mobile wireless device A or it may be an integrated circuit chip or card physically attached to the mobile wireless device A, such as with a flash card adapter. The NFC controller 16A may include a processor, a read only memory (ROM), and random access memory (RAM). The NFC controller 16A may include an NFC radio or the NFC radio may be separately connected. The NFC controller 16A may include its own battery or it may use power supplied by the mobile wireless device A. The ROM and/or RAM may be a removable memory device such as a smart card, SIM, WIM, semiconductor memory such as RAM, ROM, PROMS, flash memory devices, etc.

NCI firmware in the NFC controller 16A may communicate bidirectionally with the NFC controller 16B via magnetic field induction, where two loop antennas are located within each other's near-field, effectively energizing a wireless contact by forming an air-core transformer. An example NFC radio operates within the unlicensed radio frequency ISM band of 13.56 MHz, with a bandwidth of approximately 2 MHz over a typical distance of a few centimeters. The user may bring the NFC radio on the NFC controller 16A close to the NFC controller 16B of the smart cover B to allow near-field, bidirectional communication between the devices.

When two NFC controllers 16A and 16B are brought into close proximity, they may establish NFC communication based on the NFC Forum Logical Link Control Protocol (LLCP) specification. In example embodiments of the invention, the NFC controller 16A may be a contactless smartcard reader having characteristics similar to those described in the ISO/IEC 14443 proximity-card standard, the smartcard and reader being associated or combined as a single component capable of two-way communication, and may use the ISO/IEC 18092 NFC communication standard.

In an example embodiment of the invention, the smart cover B may optionally include a processor 20B with a CPU, RAM, and ROM for storing data and/or computer program code, memory 32, a removable storage 126, accessory electronics 34, an NFC controller 16B, and the photovoltaic cell, solar cell, or solar panel 30.

In an example embodiment of the invention, the smart cover B may send a mechanical signal, an electrical signal, or a wireless signal to the mobile wireless device A, indicating that accessory electronic components 34 in the smart cover B are to be powered by optical powering. The signal may indicate a capability to use optical powering or a current need for optical powering of the components 34 in the smart cover B. In an alternate example embodiment of the invention, the signal may result from a user input to a user interface of the mobile wireless device A commanding the mobile wireless device A to provide optical power to the smart cover B.

In an example embodiment of the invention, a Hall sensor may be used in the mobile wireless device A to detect whether the smart cover B is attached in its close contact position of FIG. 1. This may require that a magnet in the smart cover B and the Hall sensor in mobile wireless device A are aligned correctly, so that the Hall sensor changes its output voltage when the smart cover B is in the close contact position.

Figure 1A:
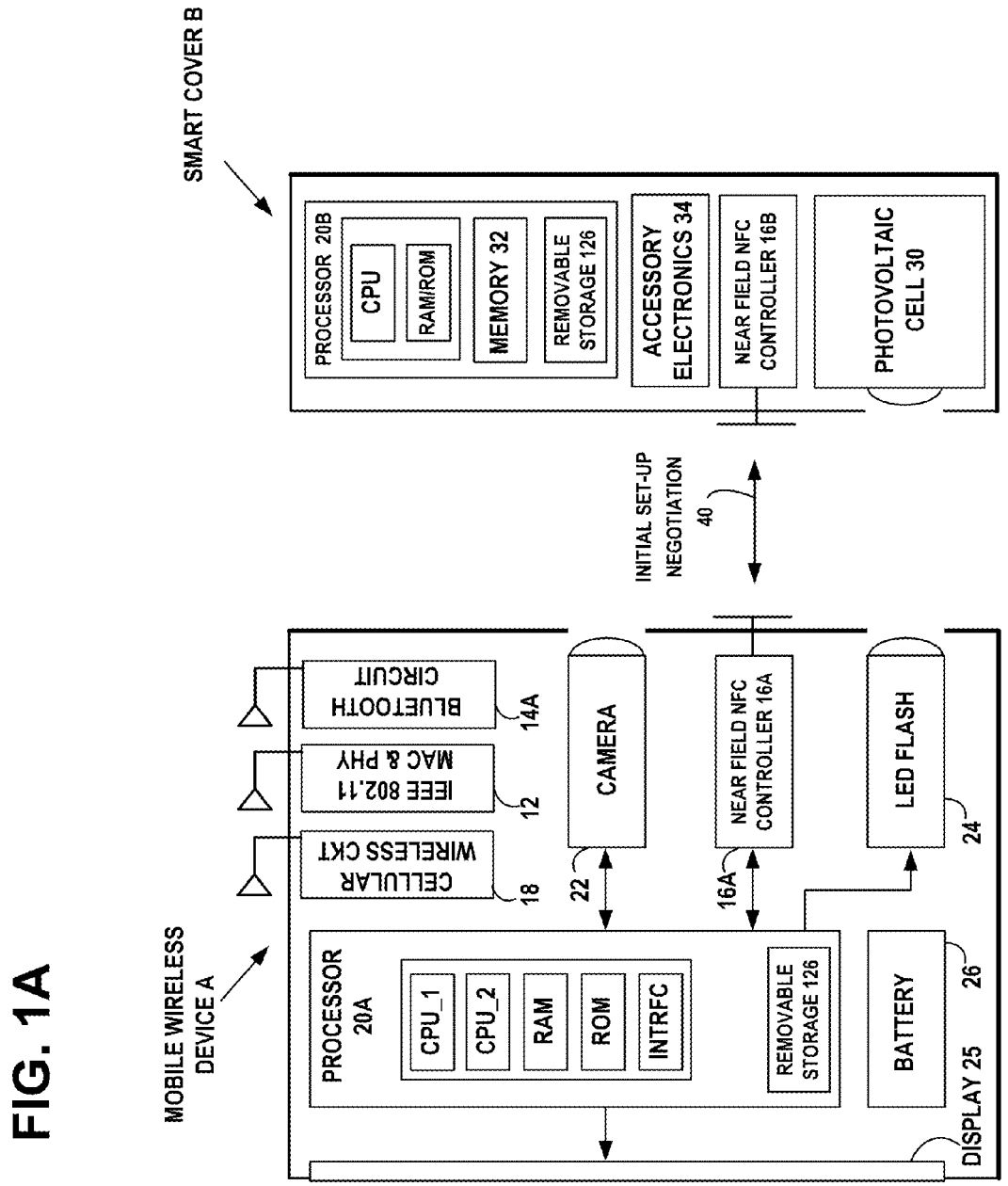
FIG. 1A is an example network diagram of a mobile wireless device A and a smart cover B, where the cover is shown separated from the backside of the device to facilitate depicting in the figure the device and the cover performing an initial setup negotiation. The negotiation is using a Near Field Communications (NFC) connection to establish supplementary optical power delivery from the mobile wireless device A to the smart cover B, in accordance with example embodiments of the invention.

FIG. 1A is an example network diagram of the mobile wireless device A and the smart cover B, where the smart cover B is shown separated from the backside of the mobile wireless device A to facilitate depicting the mobile wireless device A and the smart cover B performing an initial setup negotiation using a Near Field Communications (NFC) connection. The negotiation may be to establish supplementary optical power delivery from the mobile wireless device A to the smart cover B, in accordance with example embodiments of the invention.

In accordance with an example embodiment of the invention, the NFC controller 16A of the mobile wireless device A may send an NFC interrogation signal to read the NFC controller 16B of the smart cover B and receive a radio frequency NFC response signal 40 from the cover B. The response signal 40 may indicate that the smart cover B is capable of receiving optical powering. An initial setup negotiation may be conducted between the mobile wireless device A and the smart cover B, via an NFC connection 40 established between them. The mobile wireless device A may receive a radio frequency wireless message from the smart cover B, indicating optical power requirements of the smart cover B. In response, the mobile wireless device A may transmit optical power at a level based on the indicated optical power requirements. Then, in accordance with an example embodiment of the invention, the processor 20A of the mobile wireless device A may switch on the camera flash 24 to transmit the optical power to the smart cover B, in response to the indicated optical power requirements.

Figure 1B:
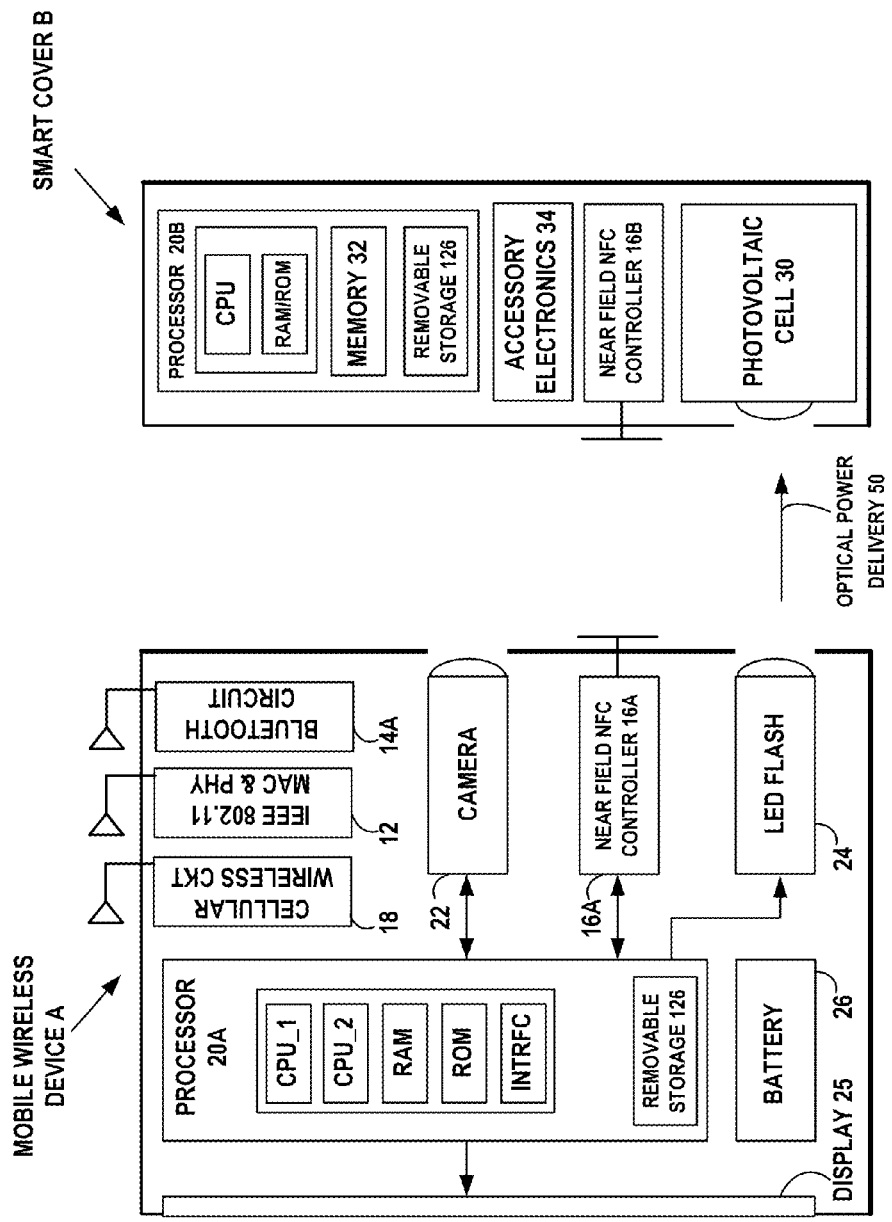
FIG. 1B is an example network diagram of the mobile wireless device A and the smart cover B, where the cover is shown separated from the backside of the device to facilitate depicting the device and the cover performing the supplementary optical power delivery from the mobile wireless device A to the smart cover B. The optical power delivery is using the LED flash of the camera component of the mobile wireless device A to illuminate and energize the photovoltaic cell in the smart cover B, in accordance with example embodiments of the invention.

FIG. 1B is an example network diagram of the mobile wireless device A and the smart cover B, where the cover B is shown separated from the backside of the device A to facilitate depicting the device A and the cover B performing the supplementary optical power delivery from the mobile wireless device A to the smart cover B. The optical power delivery may be using the LED flash 24 of the camera component 22 of the mobile wireless device A to illuminate and energize the photovoltaic cell 30 in the smart cover B, in accordance with example embodiments of the invention.

In accordance with an example embodiment of the invention, the smart cover B may receive the optical power 50 from the mobile wireless device A and use it to operate the memory 32 and electronic components 34 in the cover B.

In accordance with an example embodiment of the invention, the mobile wireless device A may receive an NFC message from the smart cover B, indicating a change in optical power requirements of the cover B. In response, the mobile wireless device A may adjust the optical power 50 that it transmits, based on the indicated change in optical power requirements.

In accordance with an example embodiment of the invention, the mobile wireless device A may transmit optical power 50 to the smart cover B, which provides energy to the smart cover B, to supplement other energy provided to the smart cover B by the near field communications (NFC) signal 40.

In accordance with an example embodiment of the invention, the mobile wireless device A may receive an NFC message from the smart cover B, indicating no more optical power 50 is required by the cover B and, in response, the processor 20A in the mobile wireless device A may switch off the camera flash 24 in the mobile wireless device A.

In accordance with an embodiment of the invention, mobile wireless device A may further include a Bluetooth transceiver 14A, a IEEE 802.11 WLAN transceiver 12A, and a cellular telephone transceiver 18A. The cellular telephone transceiver 18A may be based on Wide Area (WAN) communications protocols that include Global System for Mobile Communications (GSM), General Packet Radio service (GPRS), Enhanced data rates for GSM evolution (EDGE), Evolution-Data Optimized (EV-DO), and Wideband Code Division Multiple Access (W-CDMA).

FIG. 1C is an example network diagram of a mobile wireless device Ax and a smart cover Bx, performing an initial setup negotiation using a combined UWB and narrow-band wireless memory tag technology. The negotiation may be to establish supplementary optical power delivery from the mobile wireless device Ax to the smart cover Bx, in accordance with example embodiments of the invention.

The mobile wireless device Ax may include a narrow-band transmitter 19A to provide both power and clock signals 42 to a smart cover Bx. The mobile wireless device Ax may further include an ultra-wide band transceiver 17A to transmit and receive ultra-wide band signals with the smart cover Bx, at a very high data rate within reference time frames established by the narrow-band clock signals. Correspondingly, the smart cover Bx may include a wireless module 19B to extract the narrow-band clock signals and wireless power signal 42 to establish the reference time frames and to receive the operating power from the mobile wireless device Ax. The wireless memory module Bx may further include an ultra-wide band transceiver 17B to transmit and receive the ultra-wide band signals with the mobile wireless device Ax, at the very high data rate within the reference time frames established by the narrow-band clock signals. Clock extraction may not always be mandatory, but it may be preferable for power saving and simpler synchronization.

The narrow-band signal may have an example frequency in the range of 860 MHz to 960 MHz or 13.56 MHz. The bandwidth of the narrow band signal depends on embodiment and may be for example, 50 KHz to 1 MHz. The synchronization signal provides a timing reference for the smart cover Bx. The timing reference provides a resolution of one period, of the synchronization signal, referred to as an elementary time unit, ETU. For instance, if the frequency of the synchronization signal 152 is 900 MHz, 1 ETU≈1.1 ns.

The ultra-wide band transceiver 17A/17B may have an example frequency of 7.9 GHz. In an example embodiment, the modulation of the ultra-wide band signal is on-off keying (OOK) modulation with one pulse per symbol, and every symbol is divided into X ETUs. For example: X=64 and ETU~1.1 ns=>14.2 M symbols/second or 14.2 Mbps when one bit is represented by one symbol. In other words, a pulse repetition period (PRP) or a radio frame lasts X ETUs, wherein X is, for instance, 8, 16, 32 or 64.

The radio frame may also be divided into slots where one slot lasts for example 16 ETUs and thus one PRP equals to four slots (still assuming that X is 64). One given slot of the frame may be used by one tag for transmitting (or receiving) a pulse. A symbol may be represented by X successive pulses. Each pulse may last for at least one ETU. In this example embodiment, one pulse may extend over two or more ETUs. Thus, the ultra-wide band transceiver may send pulses to test a given timing offset (e.g. 0 to 63 ETUs from starting of the PRP), which the smart cover may receive after a pulse transfer delay that may be caused, for example, by radio propagation delay and signal processing delays. The response pulses from the smart cover may be sent with another pulse transfer delay. Assume that the pulses and the sensitivity periods each cover two ETUs and the smart cover is constructed to advance its transmissions that much, so that if the smart cover is touching the mobile wireless device Ax, the tail of a pulse sent by the smart cover Bx is detected by the mobile wireless device Ax in one pulse. When such a smart cover Bx is separated by a range matching with the radio propagation delay of one ETU, the response pulses become delayed by two ETUs (down- and uplinks combined), but still the response pulses co-inside with one ETU within the reception sensitivity period of the ultra-wide band transceiver. Thus, the smart cover Bx may reside anywhere within the range corresponding to radio propagation during one ETU i.e. some 33 cm in case of 900 MHz, narrow-band synchronization signal.

In accordance with an example embodiment of the invention, an initial setup negotiation may be conducted between the mobile wireless device Ax and the smart cover Bx, via the ultra-wide bandwidth connection 40x established between the devices. The mobile wireless device Ax may receive a radio frequency wireless message from the smart cover Bx, indicating optical power requirements of the smart cover Bx. In response, the mobile wireless device Ax may transmit optical power at a level based on the indicated optical power requirements. Then, in accordance with an example embodiment of the invention, the processor 20A of the mobile wireless device Ax may switch on the camera flash 24 to transmit the optical power to the smart cover Bx, in response to the indicated optical power requirements.

In accordance with an example embodiment of the invention, the smart cover may have a single-frequency band radio interface. If single-frequency band radio interface is a narrow-band signal (like 13.56 MHz NFC), then the data-rate may be limited (but the efficiency of wireless powering may be better). A limited data rate may be useful when the memory size of the smart cover is limited. If single-frequency band radio interface is a wide-band signal, the data-rate may be better for fast memory access in the smart cover (but efficiency of wireless powering may decrease). A high data rate supports larger memories, but wireless powering may limit the memory capacity and speed of memory.

In accordance with an example embodiment of the invention, the smart cover may have a dual-frequency band radio interface. By using two frequencies (one primarily for wireless powering, and the other one for high bandwidth) the performance of the smart cover may be improved.

In both cases additional optical powering improves the performance of memory access in smart cover (resulting in better overall/end-to-end performance).

Figure 2:
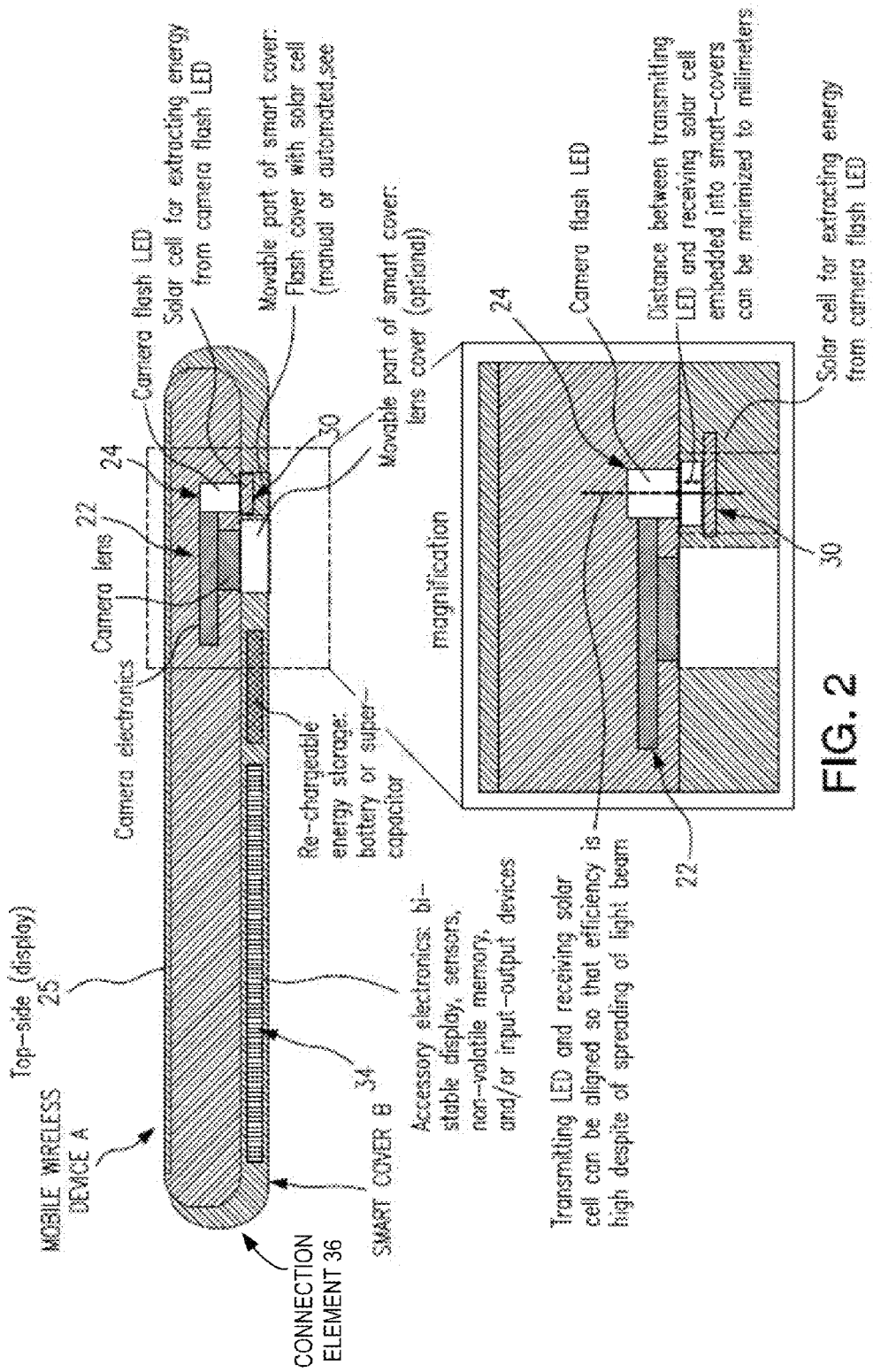
FIG. 2 is an example side view of an example embodiment of the mobile wireless device A and the smart cover B, where the cover is in its normal, close contact position with the backside of the mobile wireless device. The cover protects the camera lens and camera flash also located on the back side of the device. The figure shows example details of the camera components, camera flash, and the solar cell and accessory electronics in the cover, in accordance with example embodiments of the invention.

FIG. 2 is an example side view of an example embodiment of the mobile wireless device A and the smart cover B, where the cover B is in its normal, close contact position with the backside of the mobile wireless device A.

In accordance with an example embodiment of the invention, the smart cover B may be attached to or released from the mobile wireless device A by means of the connection element 36. The connection element 36 may be an elastic cuff composed of a resilient plastic or rubber, which surrounds the side edge of the mobile wireless device A, to enable an easy attachment or release of the smart cover A. The connection element 36 may alternately be magnetic or have an adhesive surface that adheres to the mobile wireless device A, to enable an easy attachment or release of the smart cover A.

The cover protects the camera lens 22 and camera flash 24 also located on the back side of the device. The figure shows example details of the camera components, camera flash 24, and the photovoltaic or solar cell 30 and accessory electronics 34 in the cover B, in accordance with example embodiments of the invention.

In accordance with an example embodiment of the invention, the power collected by the photovoltaic or solar cell 30 may be used directly or stored into a re-chargeable battery, super-capacitor etc. in the cover B.

In accordance with an example embodiment of the invention, in the remote powering mode, the photovoltaic or solar cell 30 of cover B may be mechanically moved on top of the LED/flash light 24 to power the functionality embedded into the cover B.

The efficiency of powering may be very high since the distance between Flash 24 and photovoltaic or solar cell 30 may be minimized to millimeters or even less.

In accordance with an example embodiment of the invention, the accessory electronics 34 embedded into the cover B may be capable of moving the photovoltaic or solar cell 30 on top of the LED/flash light 24 in case the charging of a rechargeable battery in the cover B gets below a certain threshold. Thus, the mobile wireless device A may charge the rechargeable battery in the cover B by activating the LED/flash light 24. In accordance with an example embodiment of the invention, the moving the of photovoltaic or solar cell 30 may be carried out by a piezoelectric actuator or by an electro-mechanical actuator, such as a solenoid, for example.

In accordance with an example embodiment of the invention, the photovoltaic or solar cell 30 may be on top of the LED/flash light 24 and the mobile wireless device A may command the accessory electronics 34 in the cover B to move the photovoltaic or solar cell 30 away from the front of LED/flash light 24 when the camera 22 of device A is using the LED/flash 24 for photography. In that case, the mobile wireless device A may modulate the light generated with the LED/flash light 24 with a known signal pattern that indicates to the accessory electronics 34 in the cover B that the photovoltaic or solar cell 30 needs to be moved away from the front of LED/flash light 24.

In accordance with an example embodiment of the invention, the cover B may include a high-resolution or bi-stable display 25 that may be powered by the optical powering 50 without galvanic connection between the mobile wireless device A and the cover B. In accordance with an example embodiment of the invention, the data to update the content presented on the display 25 may be transferred over an ultra-low power and short distance radio connection, such as with the NFC controller 16A and/or by modulating the camera LED flash 24.

In accordance with an example embodiment of the invention, the cover B may include sensors that collect data and which are powered by using the optical power 50 transmitted by camera LED flash 24. For sensor measurement, the cover B may include a re-chargeable battery or super-capacitor to allow intermittent powering with the LED flash 24.

In accordance with an example embodiment of the invention, the cover B may include an embedded, non-volatile memory that is used as an additional storage for the mobile wireless device A. The memory and a wireless connection to transfer data between the cover B and the mobile wireless device A may be powered fully or partially by using camera LED flash.

In accordance with an example embodiment of the invention, the cover B may include sensors to collect the data over a longer period of time and store the data to the non-volatile memory in the cover B. The energy stored in a rechargeable battery or super-capacitor embedded in the cover B, may enable the cover B to operate autonomously from the mobile wireless device for periods of time, to collect data with the sensors. The data may be transferred to the mobile wireless device A when the cover B is reattached to the mobile wireless device A.

In accordance with an example embodiment of the invention, the cover B may also include a touch screen that may be used as an input device or as a user interface for the mobile wireless device.

In accordance with an example embodiment of the invention, in addition to or instead of the NFC controller 16B, the cover B may include a low power radio transceiver, such as a Bluetooth Low Energy (LE) device, to transfer control and payload data, such as data collected by sensors in the cover B, between the mobile wireless device and the cover B. In accordance with an example embodiment of the invention, the cover B may also include an antenna array coupled to the Bluetooth LE transceiver, to enable a direction finding capability. In such a case, the functionality embedded into the cover B may be powered by the optical power 50 from the camera LED flash 24. The direction finding may be carried out with the Bluetooth LE transceiver and the collected data may be transferred from the smart covers B to the mobile wireless device A using the standard Bluetooth LE link that may be interleaved with the direction finding signaling.

In accordance with an example embodiment of the invention, the command to remove the photovoltaic or solar cell 30 from the front of LED/flash light 24 may trigger a sequence wherein the photovoltaic or solar cell 30 is moved away from the front of LED/flash light 24 for a predefined period of time, after which the accessory electronics 34 in the cover B may move the photovoltaic or solar cell 30 back on top of the LED/flash light 24. In accordance with an example embodiment of the invention, the period of time may be communicated by the mobile wireless device A to the cover B with a known signal pattern, as part of the command to move the photovoltaic or solar cell 30 away from the front of LED/flash light 24.

In accordance with an example embodiment of the invention, the initialization of data-transfer may trigger a sequence to move a lens or mirror in front of the LED/flash light 24 in the mobile wireless device, instead of to moving the photovoltaic or solar cell 30 in the cover B so as to be away from the front of the LED/flash light 24. In this manner, the mobile wireless device A may provide a focused beam of light for additional power to the photovoltaic or solar cell 30 in the cover B.

In accordance with an example embodiment of the invention, the power transfer efficiency of the optical powering 50 may depend on the efficiencies of the LED flash 24 and the photovoltaic or solar cell 30 (typically 6-8% for a low cost one) as well as on how much of the LED's light is incident on the photovoltaic or solar cell 30 surface due to the light beam divergence. In accordance with an example embodiment of the invention, even if the total transfer efficiency were only a few percent, this would be enough to enable the optical power 50 to power the functionality of the accessory electronics 34 in smart cover B.

Figure 3:
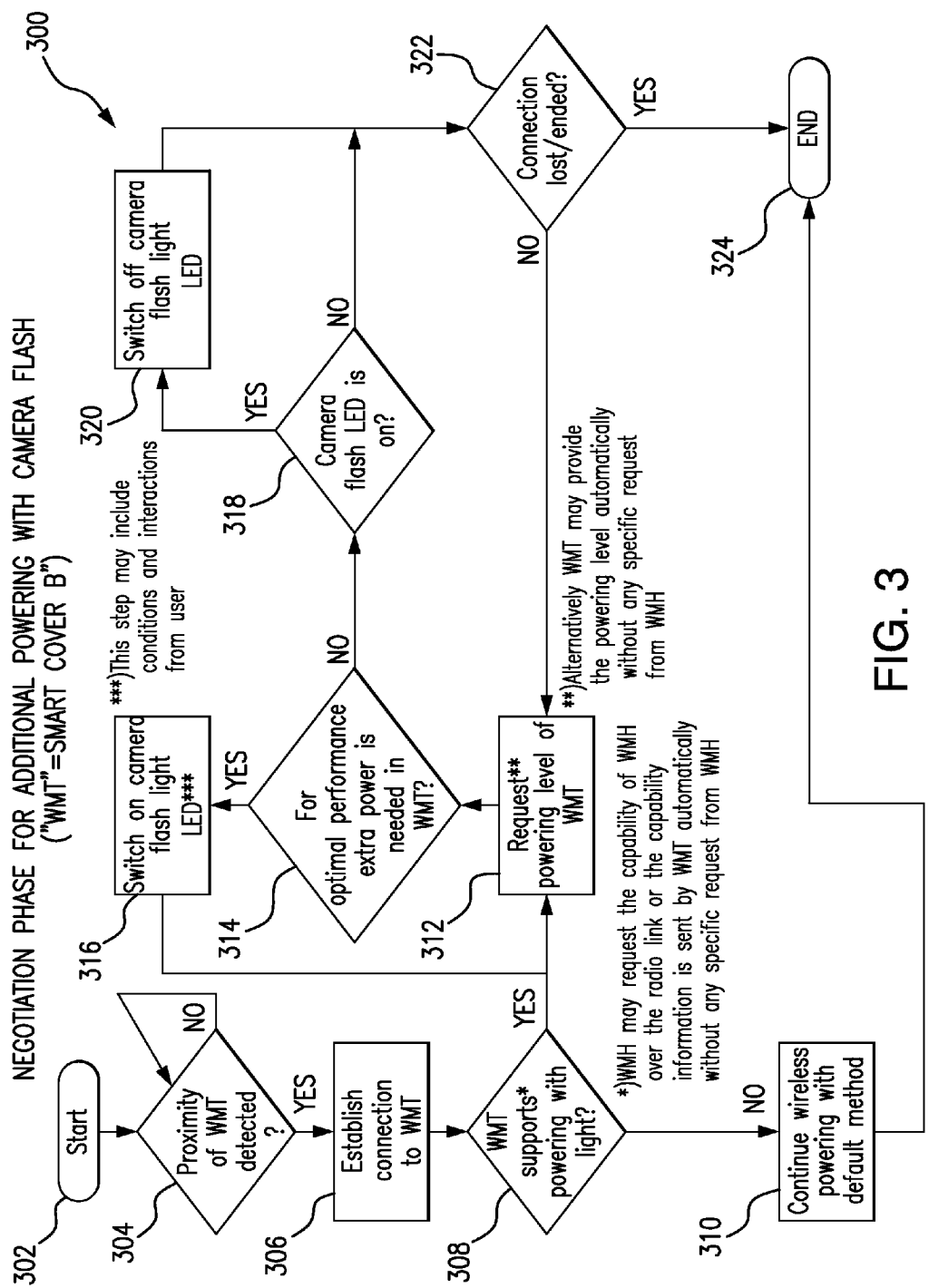
FIG. 3 is an example flow diagram of the process performed by first mobile wireless device A in the initial setup negotiation using a Near Field Communications (NFC) or ultra wideband communications connection. The negotiation is to establish supplementary optical power delivery from the first mobile wireless device A to the smart cover B, in accordance with example embodiments of the invention.

FIG. 3 is an example flow diagram 300 of the process performed by the mobile wireless device A in the initial setup negotiation using a Near Field Communications (NFC) connection to establish supplementary optical power delivery from the mobile wireless device A to the smart cover B, in accordance with example embodiments of the invention. The steps of the flow diagram represent computer code instructions stored in the RAM and/or ROM memory of the mobile wireless device A, which when executed by the central processing units (CPU), carry out the functions of the example embodiments of the invention. The abbreviation WMH (Wireless Memory Host) in the figure, refers to the reader/writer device of the Wireless Memory Tags (WMT). The steps of the example method are as follows.

Step 302: Start
Step 304: Proximity of cover detected?
Step 306: Establish connection to cover.
Step 308: Cover supports powering with light?
Step 310: NO: Continue wireless powering with default method.
Step 312: Yes: Request powering level of cover.
Step 314: For optimal performance is extra power needed?
Step 316: YES: Switch on camera flash LED.
Step 318: NO: Is camera flash LED on?
Step 320: YES: Switch LED off.
Step 322: NO: Is connection lost or ended?
Step 324: YES: End FIG. 3A is an example flow diagram 330 of the process performed by mobile wireless device A, in accordance with example embodiments of the invention. The steps of the flow diagram represent computer code instructions stored in the RAM and/or ROM memory of the mobile wireless device A, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 332: receiving, by an apparatus, a signal indicating that a functional exchangeable cover attached to the apparatus requests optical powering, the signal being at least one of a mechanical signal, an electrical signal, or a wireless signal;

Step 334: switching on, by the apparatus, an optical energy source in the apparatus in response to received signal; and Step 336: transmitting, by the apparatus, from the optical energy source, optical power to the functional exchangeable cover attached to the apparatus.

FIG. 3B is an example flow diagram 360 of the process performed by the smart cover B, in accordance with example embodiments of the invention. The steps of the flow diagram represent computer code instructions stored in the RAM and/or ROM memory of the smart cover B, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 362: sending, by a functional exchangeable cover attached to an electronic device, a signal to the electronic device, indicating that the functional exchangeable cover is to be powered by optical powering, the signal being at least one of a mechanical signal, an electrical signal, or a wireless signal;

Step 364: collecting, by the functional exchangeable cover, energy from the received optical powering signal from the electronic device in response to the signal; and Step 366: operating components of the functional exchangeable cover using at least the optical power from the mobile wireless device.

In an example embodiment of the invention, in certain situations, such as after an initialization step done when using the smart cover B for the first time, the optical powering of device A may also operate in a polling mode. In accordance with an example embodiment of the invention, the mobile wireless device A may turn on the camera flash 24 for a short period of time and wait for a wireless message 40 from the smart cover B. If the mobile wireless device A receives a wireless message 40 is received from the smart cover B, then the operation may continue as described above. However, if no wireless message 40 is detected from the smart cover B, the mobile wireless device A may stop its optical polling or it may decrease the frequency of its optical polling.

In an example embodiment of the invention, the smart cover B may include an NFC tag or wireless memory tag that stores a link to an application or the application itself, that may be needed to optimize optical powering of the smart cover B. The NFC tag may be readable either when the cover is in its open position or when it is in the close contact position. In an example embodiment of the invention, the user may read the NFC tag or wireless memory tag before moving the cover to the close contact position, to make the relevant application available when the smart cover is used.

Figure 4:
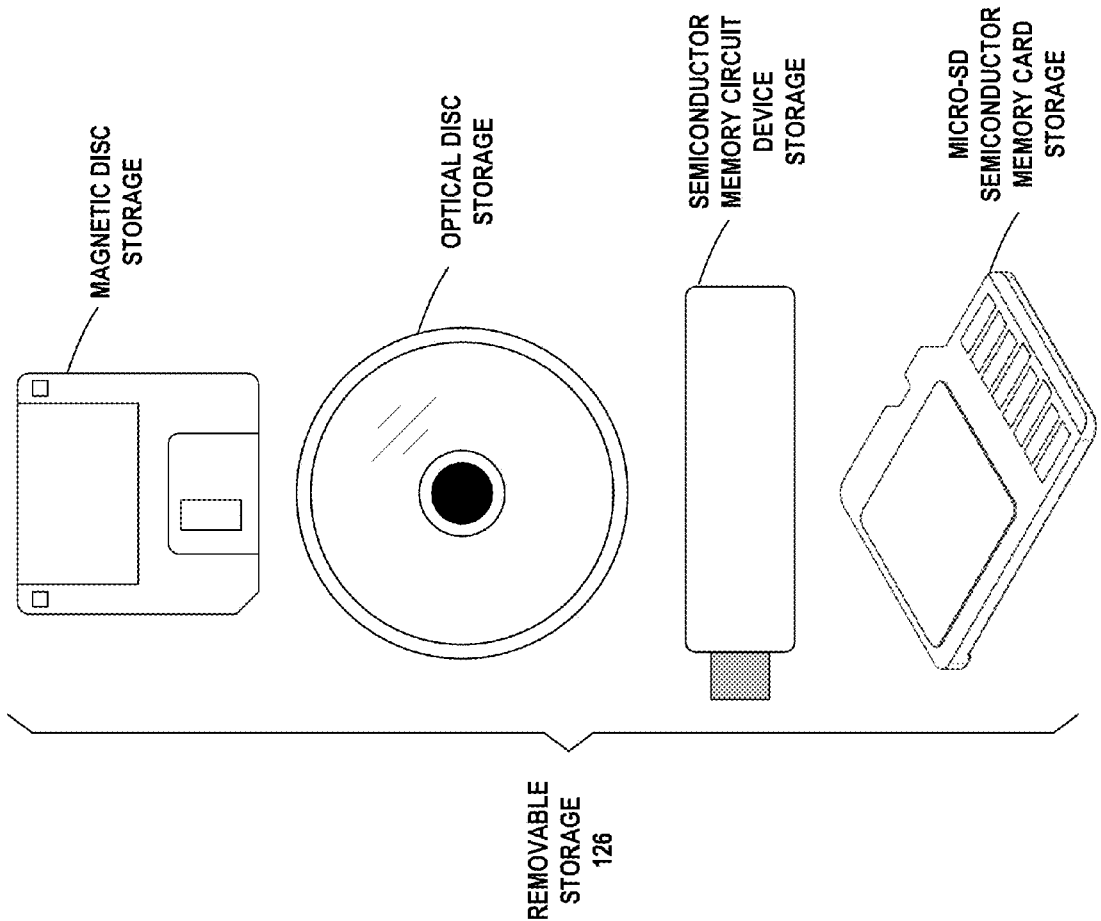
FIG. 4 illustrates an example embodiment of the invention, wherein examples of removable storage media are shown. The removable storage media may be based on magnetic, electronic and/or optical technologies, such as magnetic disks, optical disks, semiconductor memory circuit devices and micro-SD memory cards (SD refers to the Secure Digital standard). The removable storage media are for storing data and/or computer program code as an example computer program product, in accordance with at least one embodiment of the present invention.

FIG. 4 illustrates an example embodiment of the invention, wherein examples of removable storage media 126 are shown. The removable storage media may be based on magnetic, electronic and/or optical technologies, such as magnetic disks, optical disks, semiconductor memory circuit devices and micro-SD memory cards (SD refers to the Secure Digital standard). The removable storage media may be for storing data and/or computer program code as an example computer program product, in accordance with at least one embodiment of the present invention.

In accordance with an example embodiment of the invention, more energy may be provided to a smart cover that contains a non-volatile memory circuit, including relevant controls and interfaces. In accordance with an example embodiment of the invention, the smart cover may contain at least one radio to make it possible to transfer data wirelessly to and from the memory of the smart cover. In accordance with an example embodiment of the invention, the smart cover typically may not have a battery, but it may contain at least some type of energy storage.

In an example embodiment, the wireless transceiver carrier in mobile wireless device A and smart cover B may be a suitable short-range communications protocol, such as Radio Frequency Identification (RFID), Near Field Communication (NFC), Infrared Data Association (IrDA), or Ultra Wide Band (UWB), for example.

An example of the Radio Frequency Identification (RFID) out-of-band short-range carrier is described, for example, ISO 11785 (air interface protocol), ISO 14443 (air interface protocol), and ISO 15693, incorporated herein by reference.

An example of the Near Field Communication (NFC) out-of-band short-range carrier is described, for example, in ISO/IEC 14443 and ISO/IEC 18092, incorporated herein by reference.

An example of the Infrared Data Association (IrDA) out-of-band short-range carrier is described, for example, in *IrDA Link Access Protocol*, v1.1 (1996), incorporated herein by reference.

An example of the Ultra Wide Band (UWB) out-of-band short-range carrier is described, for example, in *WiMedia Common Radio Platform Specification*, Version 1.5 (2010), incorporated herein by reference.

In example embodiments, the wireless transceiver carrier in mobile wireless device A may be a suitable communications protocol, such as a Vehicle Area (WVAN) communications protocol, Wireless Video Networks (WVAN-TV) communications protocol, Personal Area (WPAN) communications protocol, Local Area (WLAN) communications protocol, or Wide Area (WAN) communications protocol, using the standard procedures and primitives defined by the respective standards. Personal Area (WPAN) communications protocols may include Bluetooth BR/EDR, Bluetooth Low Energy, Wireless USB (WUSB), Ultra Wide-band (UWB), ZigBee (IEEE 802.15.4, or IEEE 802.15.4a) for short range communication between devices. Local Area (WLAN) communications protocols may include IEEE 802.11, digital enhanced cordless telecommunications (DECT) and HIPERLAN. Wide Area (WAN) communications protocols may include Global System for Mobile Communications (GSM), General Packet Radio service (GPRS), Enhanced data rates for GSM evolution (EDGE), Evolution-Data Optimized (EV-DO), and Wideband Code Division Multiple Access (W-CDMA).

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
receiving, by a portable wireless device that includes a camera flash that is configured to be operable in association with a camera of the portable wireless device, a signal indicating that a functional exchangeable cover attached to and covering at least a portion of the portable wireless device, requests optical powering, the signal being at least one of a mechanical signal, an electrical signal, or a wireless signal, the portable wireless device including a cellular network interface, the functional exchangeable cover having an optical power receiver aligned with and facing the camera flash of the portable wireless device, when the cover is attached to and covering at least the portion of the portable wireless device, the camera flash configured to transmit energy via an optical signal to the optical power receiver in response to the receiving of the signal indicating that the functional exchangeable cover requests optical powering, to provide operating power to accessory electronic components in the functional exchangeable cover, the accessory electronic components providing accessory functionality embedded in the exchangeable cover when powered;
switching on, by the portable wireless device, the camera flash in the portable wireless device in response to the received signal; and
transmitting, by the portable wireless device, from the camera flash, an optical signal to the optical power receiver of the functional exchangeable cover while attached to and covering at least a portion of the portable wireless device.

2. The method of claim 1, further comprising:
receiving, by the portable wireless device, a radio frequency wireless message from the functional exchangeable cover of the portable wireless device, indicating optical power requirements of the cover; and
transmitting, by the portable wireless device, optical power at a level based on the indicated optical power requirements, in response to the receiving of the radio frequency wireless message.

3. The method of claim 1, further comprising:
receiving, by the portable wireless device, a radio frequency wireless message from the functional exchangeable cover of the portable wireless device, indicating a change in optical power requirements of the cover of the portable wireless device; and adjusting, by the portable wireless device, the optical power transmitted by the portable wireless device based on the indicated change in optical power requirements, in response to the receiving of the radio frequency wireless message.

4. The method of claim 1, wherein the radio frequency signal comprises a near field communications signal, an RFID signal, or an ultra-wide bandwidth signal.

5. The method of claim 1, further comprising:

transmitting, by the portable wireless device, a radio frequency signal providing initial power to the functional exchangeable cover of the portable wireless device, the signal comprising near field communication signal, in response to the receiving of the signal indicating that the functional exchangeable cover requests optical powering; and transmitting, by the portable wireless device, optical power to the cover, to supplement the energy provided by the radio frequency signal.

6. The method of claim 1, further comprising:

receiving, by the portable wireless device, a radio frequency wireless message from the functional exchangeable cover of the portable wireless device, indicating no more optical power is required by the cover of the portable wireless device; and switching off, by the portable wireless device, the camera flash in the portable wireless device in response to the receiving of the radio frequency wireless message.

7. The method of claim 1, further comprising:

wherein optical power receiver in the functional exchangeable cover, is moveable within the functional exchangeable cover so as to be moveable out of alignment with the camera flash of the portable wireless device, while the cover is attached to and covering at least the portion of the portable wireless device;

signaling, by the portable wireless device, that the optical power receiver of the functional exchangeable cover needs to be moved out of alignment with the camera flash to enable the camera flash to be operable for flash photography with the camera of the portable wireless device; and switching on, by the portable wireless device, the camera flash in the portable wireless device, for flash photography, in response to the optical power receiver having been moved out of alignment with the camera flash.

8. A portable wireless device, comprising:

a camera flash that is configured to be operable in association with a camera of the portable wireless device;

at least one processor;

at least one memory including computer program code;

the at least one memory and the computer program code configured to, with the at least one processor, cause the portable wireless device at least to:

receive a signal indicating that a functional exchangeable cover attached to and covering at least a portion of the portable wireless device, requests optical powering, the signal being at least one of a mechanical signal, an electrical signal, or a wireless signal, the portable wireless device including a cellular network interface, the functional exchangeable cover having an optical power receiver aligned with and facing the camera flash of the portable wireless device, when the cover is attached to and covering at least the portion of the portable wireless device, the camera flash configured to transmit energy via an optical signal to the optical power receiver in response to the receiving of the signal indicating that the functional exchangeable protective cover requests optical powering, to provide operating power to accessory electronic components in the functional exchangeable cover, the accessory electronic components providing accessory functionality embedded in the exchangeable cover when powered;

switch on the camera flash in the portable wireless device in response to the received signal; and transmit from the camera flash, an optical signal to the optical power receiver of the functional exchangeable cover while attached to and covering at least a portion of the portable wireless device.

9. The portable wireless device of claim 8, further comprising:

the at least one memory and the computer program code configured to, with the at least one processor, cause the portable wireless device at least to:

receive a radio frequency wireless message from the functional exchangeable cover of the portable wireless device, indicating optical power requirements of the cover; and transmit optical power at a level based on the indicated optical power requirements, in response to the receiving of the radio frequency wireless message.

10. The portable wireless device of claim 8, further comprising:

the at least one memory and the computer program code configured to, with the at least one processor, cause the portable wireless device at least to:

receive a radio frequency wireless message from the functional exchangeable cover of the portable wireless device, indicating a change in optical power requirements of the cover of the portable wireless device; and adjust the optical power transmitted by the portable wireless device based on the indicated change in optical power requirements, in response to the receiving of the radio frequency wireless message.

11. The portable wireless device of claim 8, wherein the radio frequency signal comprises a near field communications signal, an RFID signal, or an ultra-wide bandwidth signal.

12. The portable wireless device of claim 8, further comprising:

the at least one memory and the computer program code configured to, with the at least one processor, cause the portable wireless device at least to:

transmit a near field communications signal that provides energy to the functional exchangeable cover of the portable wireless device, in response to the receiving of the signal indicating that the functional exchangeable cover requests optical powering; and transmit optical power to the cover of the portable wireless device, to supplement the energy provided by the near field communications signal.

13. The portable wireless device of claim 8, further comprising:

the at least one memory and the computer program code configured to, with the at least one processor, cause the portable wireless device at least to:

receive a radio frequency wireless message from the functional exchangeable cover of the portable wireless device, indicating no more optical power is required by the cover of the portable wireless device; and switch off the camera flash in the portable wireless device, in response to the receiving of the radio frequency wireless message.

14. The portable wireless device of claim 8, further comprising:
- wherein optical power receiver in the functional exchangeable cover, is moveable within the functional exchangeable cover so as to be moveable out of alignment with the camera flash of the portable wireless device, while the cover is attached to and covering at least the portion of the portable wireless device;
- the at least one memory and the computer program code configured to, with the at least one processor, cause the portable wireless device at least to:
- signal, by the portable wireless device, that the optical power receiver of the functional exchangeable cover needs to be moved out of alignment with the camera flash to enable the camera flash to be operable for flash photography with the camera of the portable wireless device; and
- switch on, by the portable wireless device, the camera flash in the portable wireless device, for flash photography, in response to the optical power receiver having been moved out of alignment with the camera flash.

15. A computer program product comprising computer executable program code recorded on a computer readable non-transitory storage medium, the computer executable program code comprising:
- code for receiving, by a portable wireless device that includes a camera flash that is configured to be operable in association with a camera of the portable wireless device, a signal indicating that a functional exchangeable cover attached to and covering at least a portion of the portable wireless device, requests optical powering, the signal being at least one of a mechanical signal, an electrical signal, or a wireless signal, the portable wireless device including a cellular network interface, the functional exchangeable cover having an optical power receiver aligned with and facing the camera flash of the portable wireless device, when the cover is attached to and covering at least the portion of the portable wireless device, the camera flash configured to transmit energy via an optical signal to the optical power receiver in response to the receiving of the signal indicating that the functional exchangeable cover requests optical powering, to provide operating power to accessory electronic components in the functional exchangeable cover, the accessory electronic components providing accessory functionality embedded in the exchangeable cover when powered;
- code for switching on, by the portable wireless device, the camera flash an in the portable wireless device in response to the received signal; and
- code for transmitting, by the portable wireless device, from the camera flash, an optical signal to the optical power receiver of the functional exchangeable cover while attached to and covering at least a portion of to the portable wireless device.

16. The computer program product of claim 15, further comprising:
- wherein optical power receiver in the functional exchangeable cover, is moveable within the functional exchangeable cover so as to be moveable out of alignment with the camera flash of the portable wireless device, while the cover is attached to and covering at least the portion of the portable wireless device;
- code for signaling, by the portable wireless device, that the optical power receiver of the functional exchangeable cover needs to be moved out of alignment with the camera flash to enable the camera flash to be operable for flash photography with the camera of the portable wireless device; and
- code for switching on, by the portable wireless device, the camera flash in the portable wireless device, for flash photography, in response to the optical power receiver having been moved out of alignment with the camera flash.

* * * * *